US006950411B2

(12) United States Patent
Ozluturk et al.

(10) Patent No.: US 6,950,411 B2
(45) Date of Patent: *Sep. 27, 2005

(54) CANCELLATION OF PILOT AND TRAFFIC SIGNALS

(75) Inventors: Fatih M. Ozluturk, Port Washington, NY (US); Nadir Sezgin, Jackson Heights, NY (US)

(73) Assignee: InterDigital Technology Corp., Wilmington, DE (US)

( * ) Notice: Subject to any disclaimer, the term of this patent is extended or adjusted under 35 U.S.C. 154(b) by 66 days.

This patent is subject to a terminal disclaimer.

(21) Appl. No.: 10/462,489

(22) Filed: Jun. 16, 2003

(65) Prior Publication Data

US 2004/0120282 A1 Jun. 24, 2004

Related U.S. Application Data

(63) Continuation of application No. 10/266,408, filed on Oct. 8, 2002, now Pat. No. 6,603,743, which is a continuation of application No. 09/175,174, filed on Oct. 20, 1998, now Pat. No. 6,498,784.

(51) Int. Cl.[7] .............................................. H04B 3/20
(52) U.S. Cl. ...................... 370/286; 370/320; 370/342; 375/144; 375/147; 375/148
(58) Field of Search ............................... 370/286, 320, 370/342; 375/144–147, 148

(56) References Cited

U.S. PATENT DOCUMENTS

| 5,224,122 | A | | 6/1993 | Bruckert ........................ 375/1 |
|---|---|---|---|---|
| 5,235,612 | A | | 8/1993 | Stilwell et al. ................. 375/1 |
| 5,646,964 | A | | 7/1997 | Ushirokawa et al. ....... 375/346 |
| 5,719,852 | A | * | 2/1998 | Schilling et al. ............ 370/201 |
| 6,034,986 | A | | 3/2000 | Yellin .......................... 375/200 |
| 6,067,333 | A | | 5/2000 | Kim et al. ................... 375/346 |
| 6,154,443 | A | * | 11/2000 | Huang et al. ................ 370/210 |
| 6,192,067 | B1 | * | 2/2001 | Toda et al. .................. 375/144 |
| 6,240,099 | B1 | * | 5/2001 | Lim et al. .................... 370/441 |
| 6,252,899 | B1 | * | 6/2001 | Zhou et al. .................. 375/140 |
| 6,333,947 | B1 | * | 12/2001 | van Heeswyk et al. ..... 375/148 |
| 6,404,760 | B1 | * | 6/2002 | Holtzman et al. .......... 370/342 |
| 6,498,784 | B1 | * | 12/2002 | Ozluturk ..................... 370/288 |
| 6,553,058 | B1 | * | 4/2003 | Naito .......................... 375/148 |
| 6,584,115 | B1 | * | 6/2003 | Suzuki ........................ 370/441 |
| 6,603,743 | B2 | * | 8/2003 | Ozluturk et al. ............ 370/286 |
| 6,628,701 | B2 | * | 9/2003 | Yellin .......................... 375/148 |
| 6,667,964 | B1 | * | 12/2003 | Seki et al. ................... 370/342 |
| 6,741,634 | B1 | * | 5/2004 | Kim et al. ................... 375/144 |
| 6,782,040 | B2 | * | 8/2004 | Mesecher et al. ........... 375/148 |

FOREIGN PATENT DOCUMENTS

WO          9843362          10/1998

* cited by examiner

Primary Examiner—Zarni Maung
Assistant Examiner—Van Kim Nguyen
(74) Attorney, Agent, or Firm—Volpe and Koenig, P.C.

(57) ABSTRACT

A mobile user receiver having a cancellation system for removing selected signals from a traffic signal prior to decoding includes a receiver having a system input for receiving communication signals from a transmitter over an air interface. The system input is supplied to a traffic signal cancellation system for canceling unwanted traffic signals. The system input is also supplied to a pilot signal cancellation system for removing a global pilot signal. The output of the pilot signal cancellation system is subtracted from the output of the traffic signal cancellation system to provide a cancellation system output free from unwanted traffic signals and the global pilot signal.

12 Claims, 8 Drawing Sheets

Inphase bit stream (I)

FIG. 3B quadrature bit stream (Q)

FIG. 3C pn sequence (I or Q)

FIG. 7

CANCELLATION OF PILOT AND TRAFFIC SIGNALS

CROSS REFERENCE TO RELATED APPLICATION

This application is a continuation of U.S. patent application Ser. No. 10/266,408, filed Oct. 8, 2002, U.S. Pat. No. 6,603,743, which is a continuation of U.S. patent application Ser. No. 09/175,174, filed Oct. 20, 1998, issued as U.S. Pat. No. 6,498,784 on Dec. 24, 2002, both of which are incorporated by reference as if fully set forth herein.

BACKGROUND OF THE INVENTION

The present invention relates generally to digital communications. More specifically, the invention relates to a system and method which cancels the global pilot signal and unwanted traffic signals from a received code division multiple access signal thereby removing them as interferers prior to decoding.

DESCRIPTION OF THE PRIOR ART

Advanced communication technology today makes use of a communication technique in which data is transmitted with a broadened band by modulating the data to be transmitted with a pseudo-noise (pn) signal. The technology is known as digital spread spectrum or code division multiple access (CDMA). By transmitting a signal with a bandwidth much greater than the signal bandwidth, CDMA can transmit data without being affected by signal distortion or an interfering frequency in the transmission path.

Figure 1:
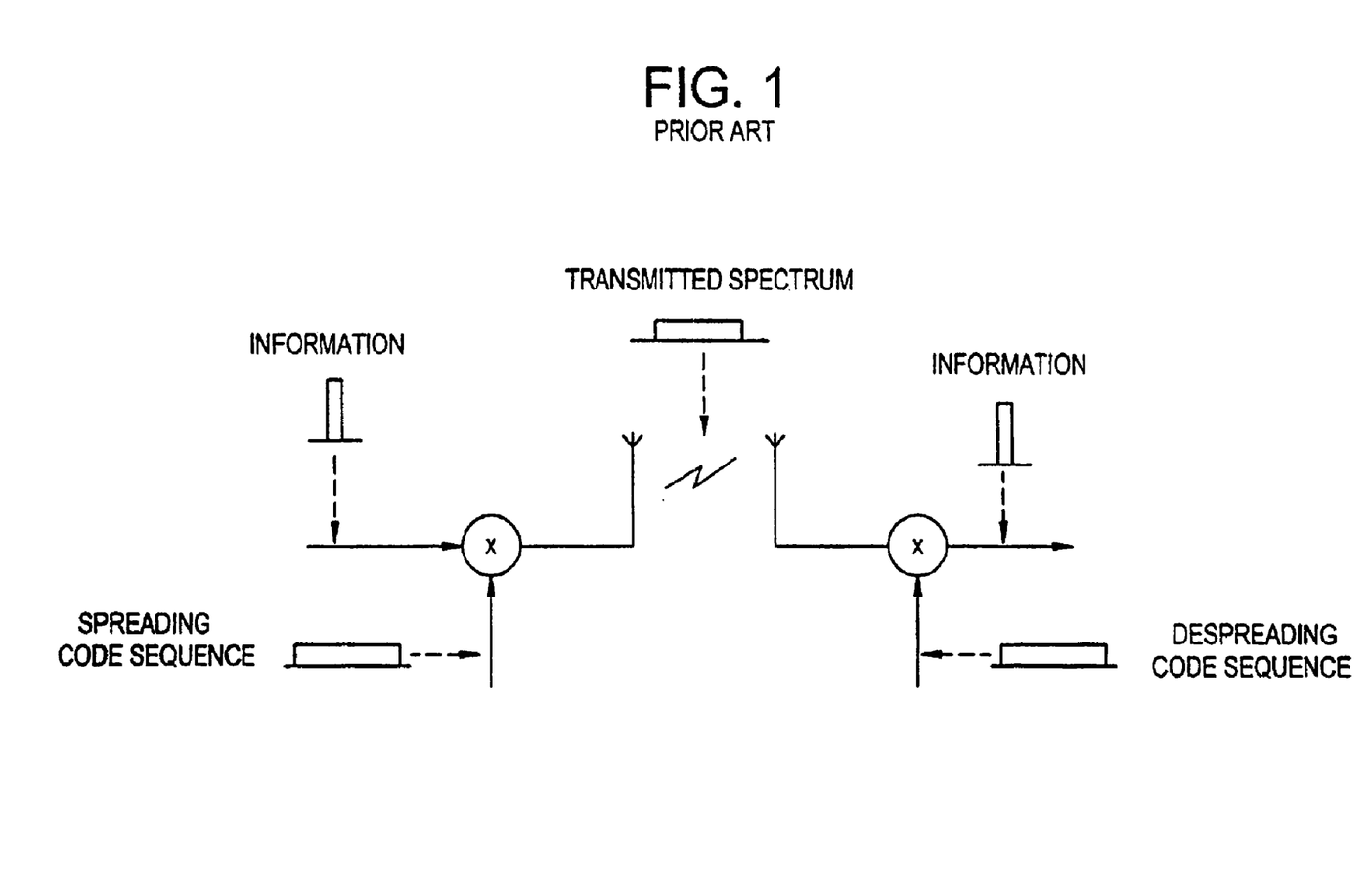
FIG. 1 is a simplified block diagram of a prior art, CDMA communication system.

Shown in FIG. 1 is a simplified, single channel CDMA communication system. A data signal with a given bandwidth is mixed with a spreading code generated by a pn sequence generator producing a digital spread spectrum signal. The signal which carries data for a specific channel is known as a traffic signal. Upon reception, the data is reproduced after correlation with the same pn sequence used to transmit the data. Every other signal within the transmission bandwidth appears as noise to the signal being despread.

For timing synchronization with a receiver, an unmodulated traffic signal known as a pilot signal is required for every transmitter. The pilot signal allows respective receivers to synchronize with a given transmitter, allowing despreading of a traffic signal at the receiver.

In a typical communication system, a base station communicates with a plurality of individual subscribers fixed or mobile. The base station which transmits many signals, transmits a global pilot signal common to the plurality of users serviced by that particular base station at a higher power level. The global pilot is used for the initial acquisition of an individual user and for the user to obtain signal-estimates for coherent reception and for the combining of multipath components during reception. Similarly, in a reverse direction, each subscriber transmits a unique assigned pilot for communicating with the base station.

Only by having a matching pn sequence can a signal be decoded, however, all signals act as noise and interference. The global pilot and traffic signals are noise to a traffic signal being despread. If the global pilot and all unwanted traffic signals could be removed prior to despreading a desired signal, much of the overall noise would be reduced, decreasing the bit error rate and in turn, improving the signal-to-noise ratio (SNR) of the despread signal.

Some attempts have been made to subtract the pilot signal from the received signal based on the relative strength of the pilot signal at the receiver. However, the strength value is not an accurate characteristic for calculating interference due to the plurality of received signals with different time delays caused by reflections due to terrain. Multipath propagation makes power level estimates unreliable.

There is a need to improve overall system performance by removing multiple noise contributors from a signal prior to decoding.

SUMMARY OF THE INVENTION

A mobile user receiver having a cancellation system for removing selected signals from a traffic signal prior to decoding includes a receiver having a system input for receiving communication signals from a transmitter over an air interface. The system input is supplied to a traffic signal cancellation system for canceling unwanted traffic signals. The system input is also supplied to a pilot signal cancellation system for removing a global pilot signal. The output of the pilot signal cancellation system is subtracted from the output of the traffic signal cancellation system to provide a cancellation system output free from unwanted traffic signals and the global pilot signal.

The present invention reduces the contributive noise effects of the global pilot signal and unwanted traffic signals transmitted in a spread spectrum communication system. The present invention effectively cancels the global pilot and unwanted traffic signal(s) from a desired traffic signal at a receiver prior to decoding. The resulting signal has an increased signal-to-noise ratio.

Accordingly, it is an object of the present invention to provide a code division multiple access communication system receiver which reduces the contributive noise effects from the pilot and active, unwanted traffic signals.

It is another object of the present invention to improve the desired traffic signal SNR by eliminating the noise effects of the global pilot and active traffic signals.

Other objects and advantages of the system and method will become apparent to those skilled in the art of advanced telecommunications after reading the detailed description of the preferred embodiment.

DESCRIPTION OF THE PREFERRED EMBODIMENTS

The preferred embodiments will be described with reference to the drawing figures where like numerals represent like elements throughout.

Figure 2A:
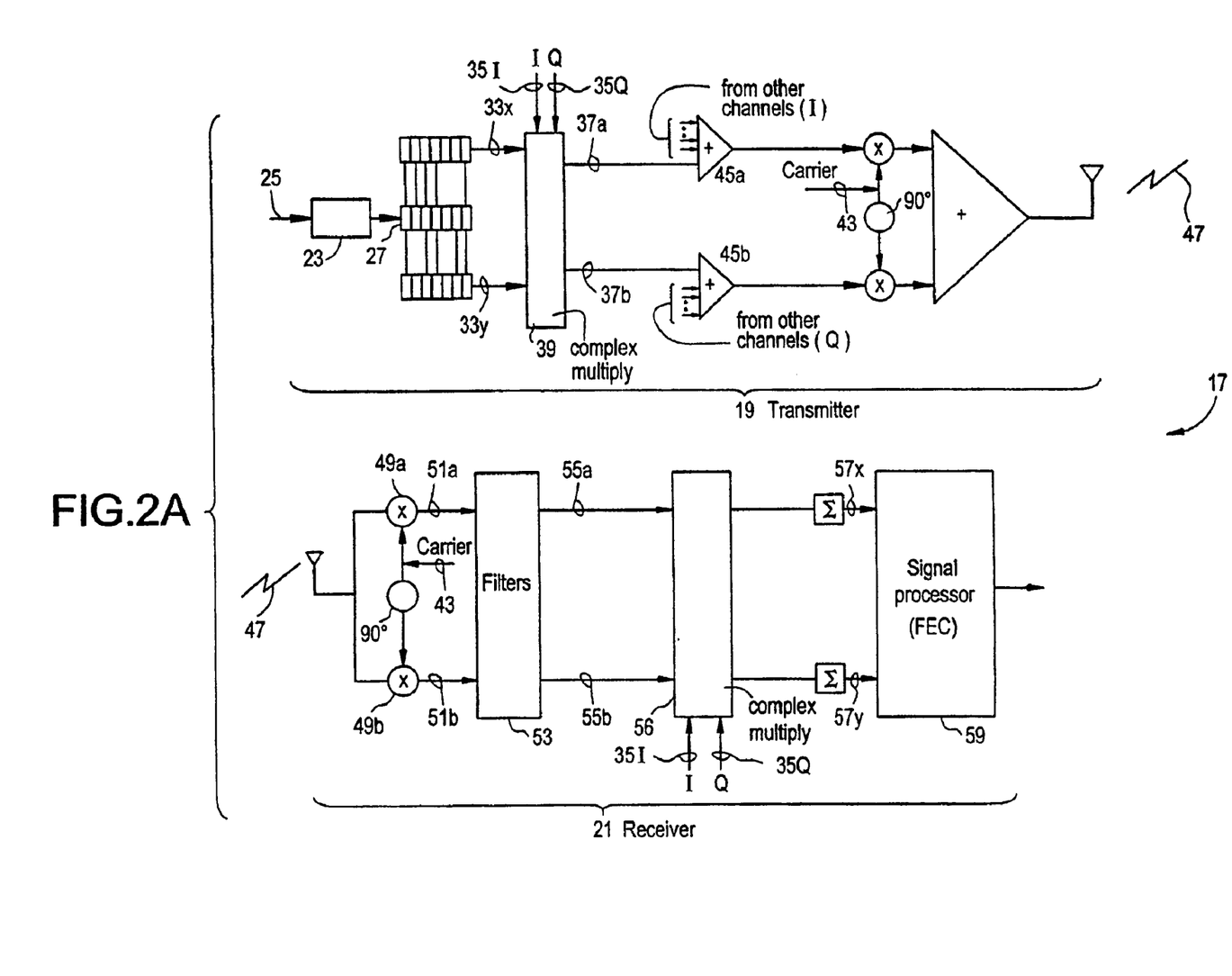
FIG. 2A is a detailed block diagram of a B-CDMA™ communication system.

A B-CDMA™ communication system 17 as shown in FIG. 2 includes a transmitter 19 and a receiver 21, which may reside in either a base station or a mobile user receiver. The transmitter 19 includes a signal processor 23 which encodes voice and nonvoice signals 25 into data at various bit rates.

By way of background, two steps are involved in the generation of a transmitted signal in a multiple access environment. First, the input data which can be considered a bi-phase modulated signal is encoded using forward error-correcting coding (FEC) 27. One signal is designated the in-phase channel I 33x. The other signal is designated the quadrature channel Q 33y. Bi-phase modulated I and Q signals are usually referred to as quadrature phase shift keying (QPSK).

Figure 2B:
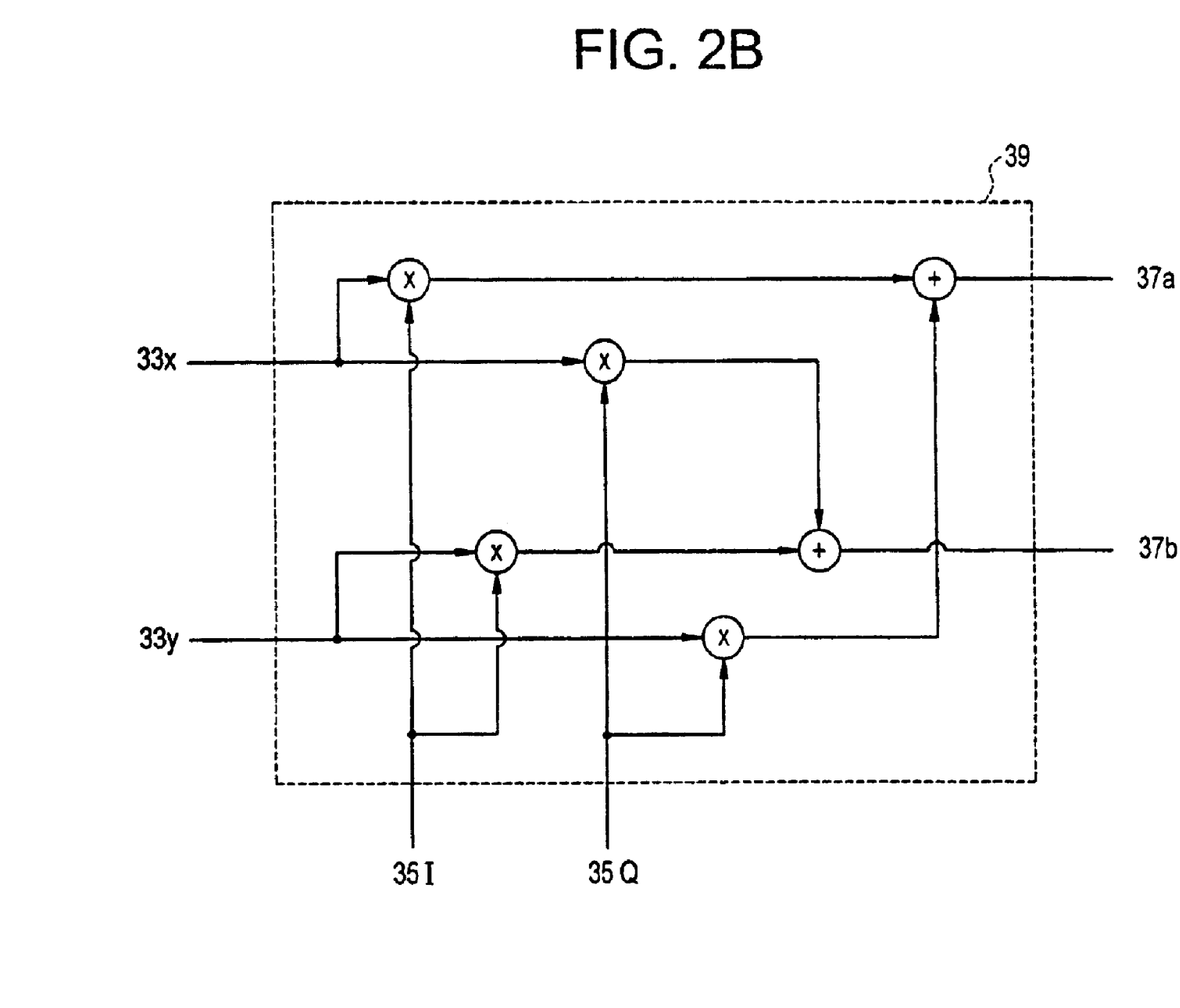
FIG. 2B is a detailed system diagram of a complex number multiplier.

In the second step, the two bi-phase modulated data or symbols 33x, 33y are spread with a complex, pseudo-noise (pn) sequence 35I, 35Q using a complex number multiplier 39. The operation of a complex number multiplier 39 is shown in FIG. 2B and is well understood in the art. The spreading operation can be represented as:

$$(x+jy) \times (I+jQ) = (xI-yQ) + j(xQ+yI) = a+jb. \quad \text{Equation (1)}$$

A complex number is in the form a+jb, where a and b are real numbers and $j^2 = -1$. Referring back to FIG. 2a, the resulting I 37a and Q 37b spread signals are combined 45a, 45b with other spread signals (channels) having different spreading codes, multiplied (mixed) with a carrier signal 43, and transmitted 47. The transmission 47 may contain a plurality of individual signals.

The receiver 21 includes a demodulator 49a, 49b which mixes down the transmitted broadband signal 47 with the transmitting carrier 43 into an intermediate carrier frequency 51a, 51b. A second down conversion reduces the signal to baseband. The QPSK signal 55a, 55b is then filtered 53 and mixed 56 with the locally generated complex pn sequence 35I, 35Q which matches the conjugate of the transmitted complex code. Only the original signals which were spread by the same code will be despread. All other signals will appear as noise to the receiver 21. The data 57x, 57y is coupled to a signal processor 59 where FEC decoding is performed on the convolutionally encoded data.

Figure 3A:
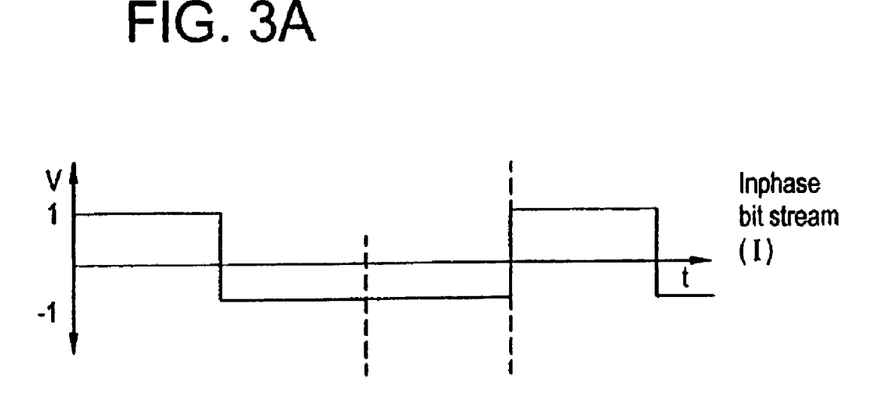
FIG. 3A is a plot of an in-phase bit stream.
Figure 3B:
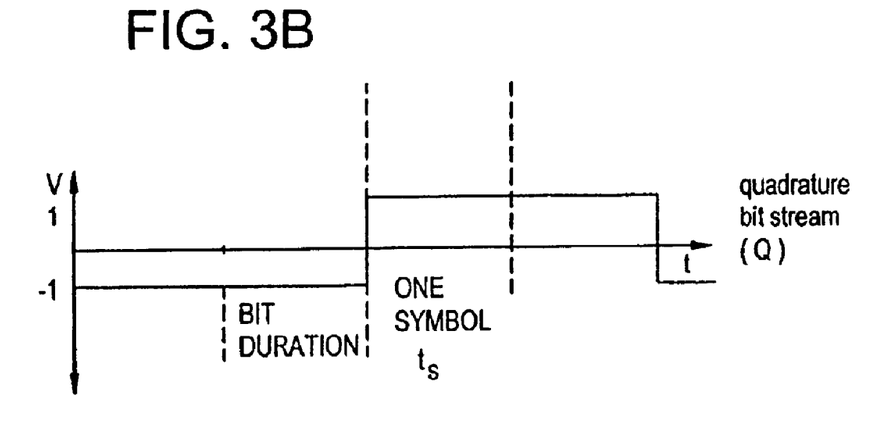
FIG. 3B is a plot of a quadrature bit stream.

As shown in FIGS. 3A and 3B, a QPSK symbol consists of one bit each from both the in-phase (I) and quadrature (Q) signals. The bits may represent a quantized version of an analog sample or digital data. It can be seen that symbol duration $t_s$ is equal to bit duration.

Figure 3C:
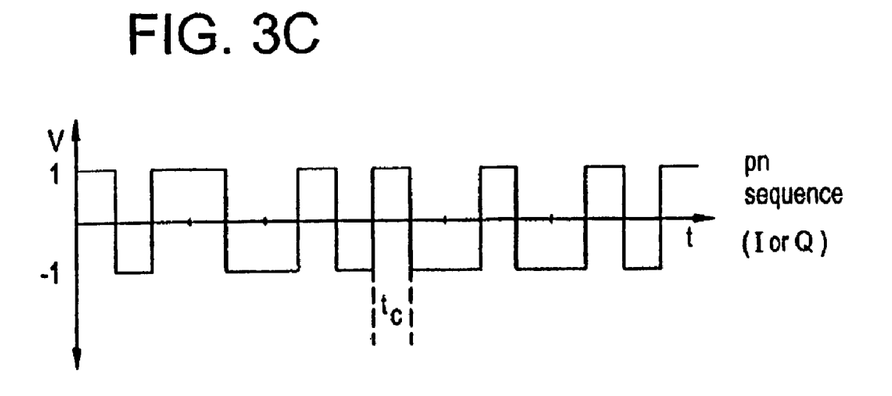
FIG. 3C is a plot of a pseudo-noise (pn) bit sequence.

The transmitted symbols are spread by multiplying the QPSK symbol stream by the complex pn sequence. Both the I and Q pn sequences are comprised of a bit stream generated at a much higher frequency, typically 100 to 200 times the symbol rate. One such pn sequence is shown in FIG. 3C. The complex pn sequence is mixed with the symbol bit stream producing the digital spread signal (as previously discussed). The components of the spread signal are known as chips having a much smaller duration $t_c$.

When the signal is received and demodulated, the baseband signal is at the chip level. When the I and Q components of the signal are despread using the conjugate of the pn sequence used during spreading, the signal returns to the symbol level.

Figure 4:
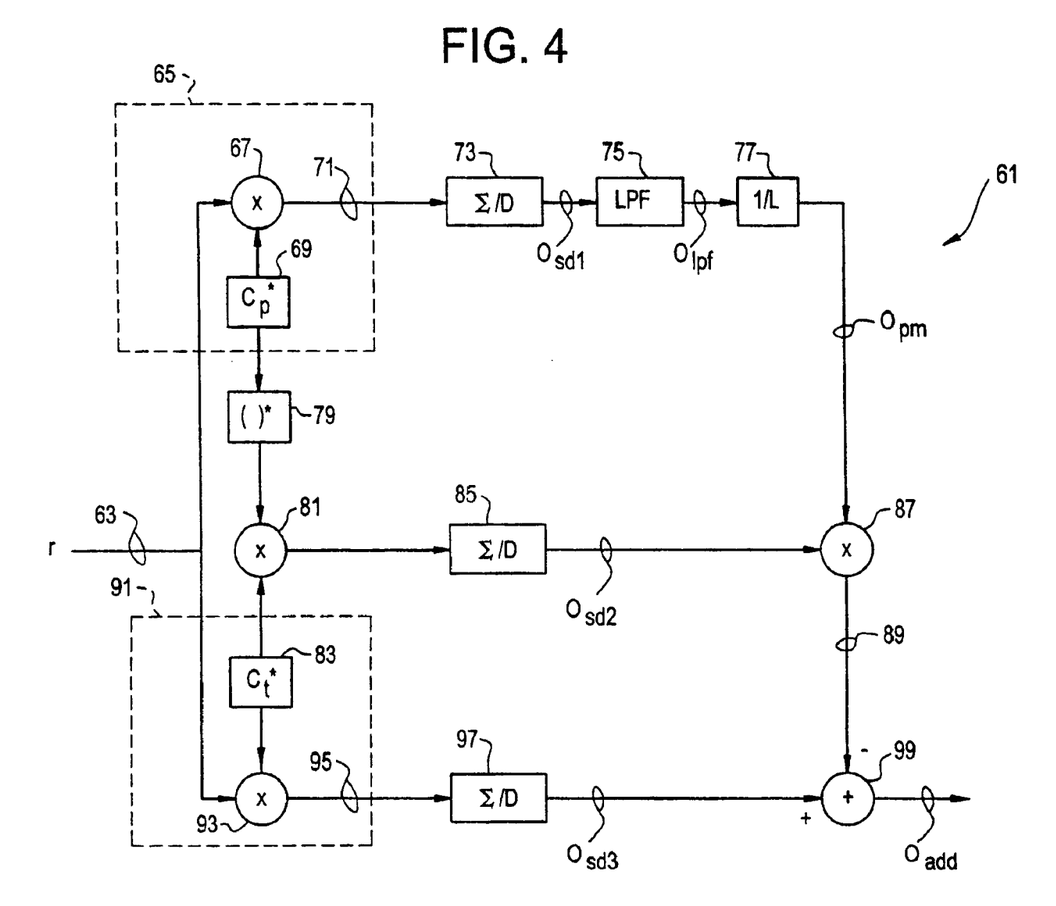
FIG. 4 is a block diagram of a global pilot signal cancellation system according to the present invention.
Figure 5:
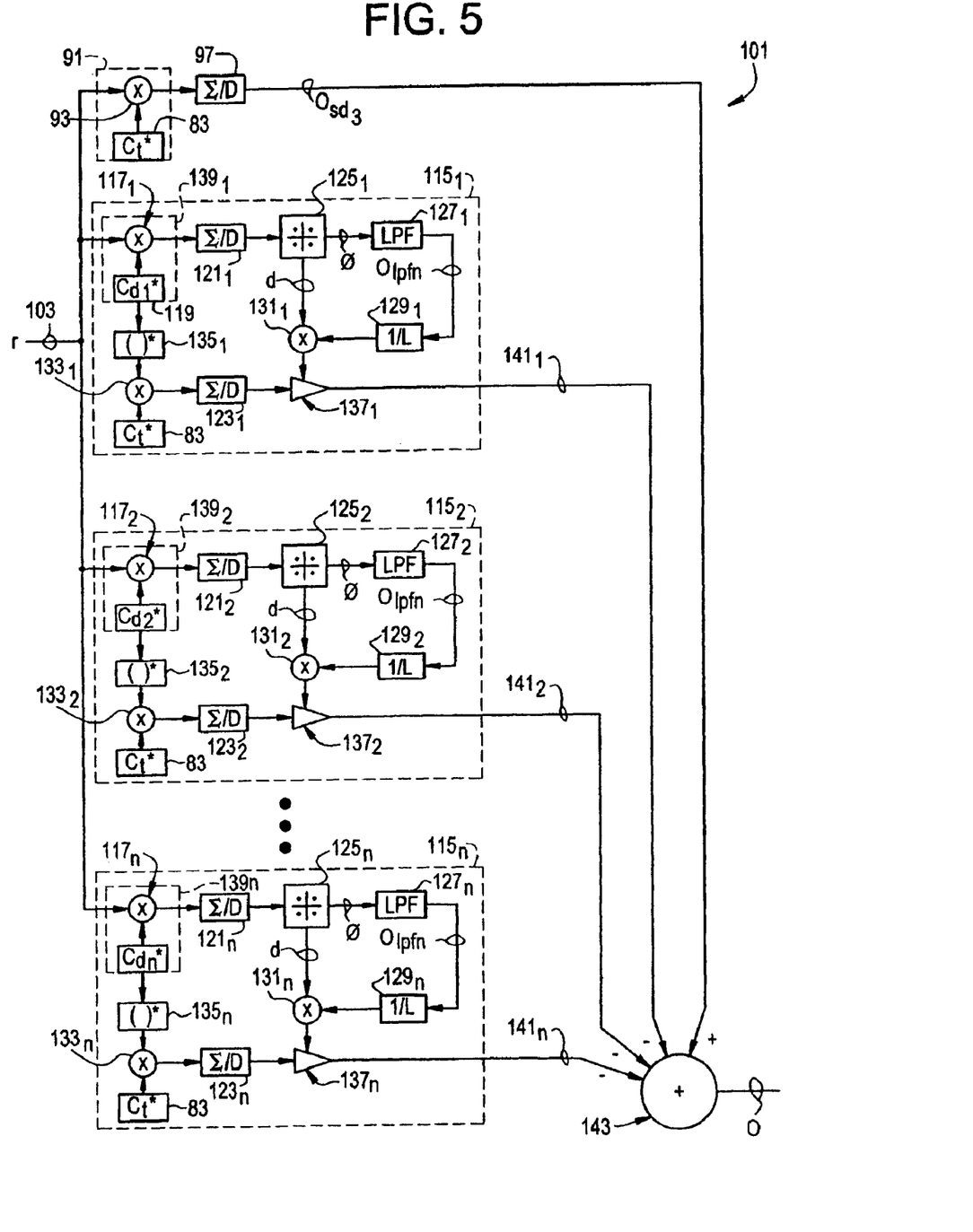
FIG. 5 is a block diagram of an unwanted traffic signal(s) cancellation system according to the present invention.
Figure 7:
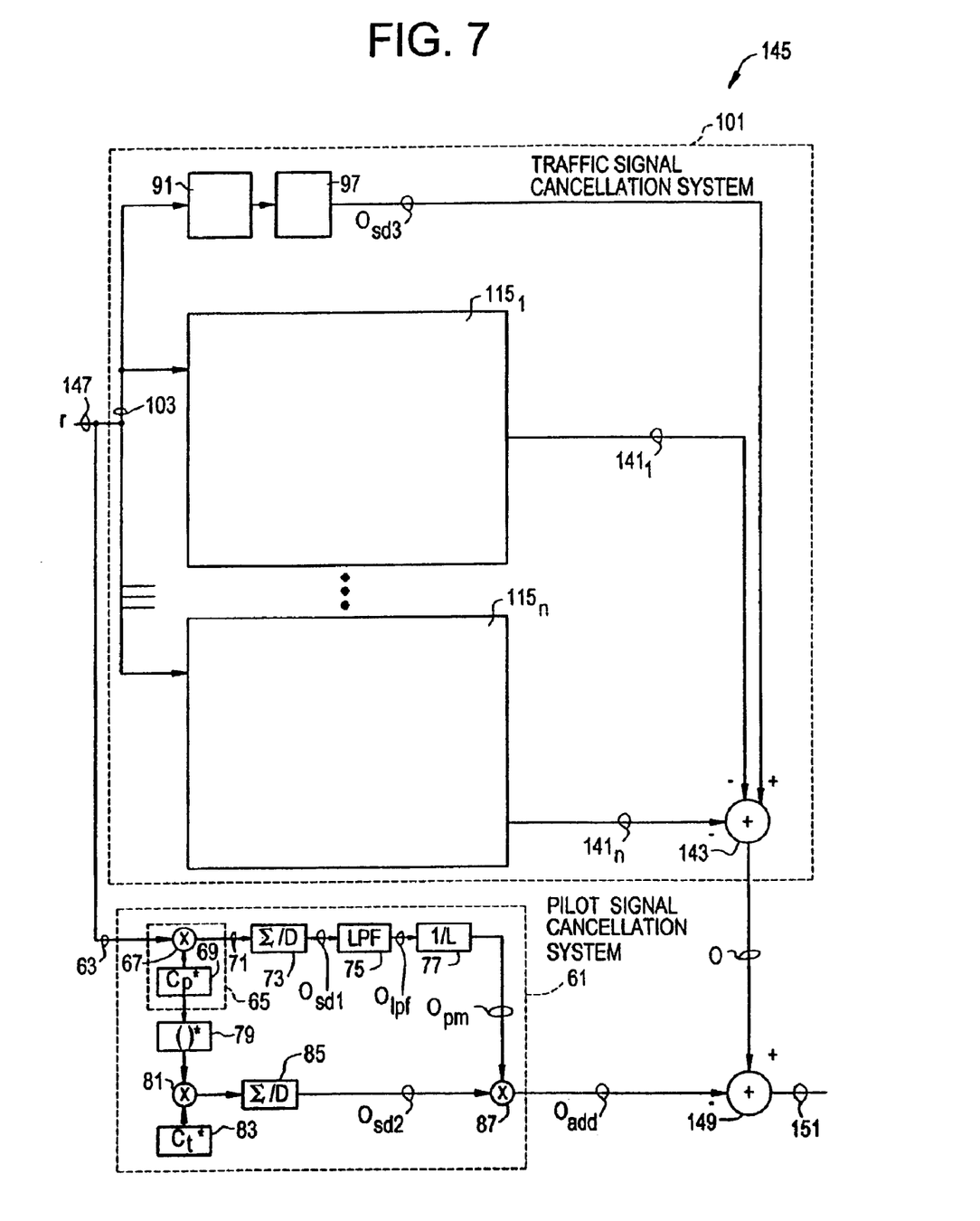
FIG. 7 is a block diagram of a combined pilot and unwanted traffic signal cancellation system according to the present invention.

The embodiments of the present invention are shown in FIGS. 4, 5 and 7. The global pilot signal cancellation system 61 embodiment is shown in FIG. 4. A received signal r is expressed as:

$$r = \alpha c_p + \beta c_t + n \quad \text{Equation (2)}$$

where the received signal r is a complex number and is comprised of the pilot strength $\alpha$ multiplied with the pilot code $c_p$, summed with the traffic strength $\beta$ multiplied with the traffic code $c_t$, summed with random noise n. The noise n includes all received noise and interference including all other traffic signals. To cancel the global pilot signal from the received signal r, the system 61 must derive the signal strength of the pilot code $\alpha$ where:

$$\alpha \neq \beta \quad \text{Equation (3)}$$

since the global pilot is transmitted at a higher power level than a traffic signal.

When the received signal r is summed over time, Equation (2) becomes:

$$\Sigma r = \alpha \Sigma c_p + \beta \Sigma c_t + \Sigma n. \quad \text{Equation (4)}$$

Referring to FIG. 4, the received baseband signal r is input 63 into the pilot signal cancellation system 61 and into a pilot despreader 65 which despreads the pilot signal from the received signal r. First mixer 67 despreads the received signal r by multiplying with the complex conjugate $c_p*$ 69 of the pilot pn code used during spreading yielding:

$$\Sigma r c_p* = \alpha \Sigma c_p c_p* + \beta \Sigma c_t c_p* + \Sigma n c_p*. \quad \text{Equation (5)}$$

A complex conjugate is one of a pair of complex numbers with identical real parts and with imaginary parts differing only in sign.

The despread pilot signal 71 is coupled to a first sum and dump processor 73 where it is summed over time. The first sum and dump 73 output $O_{sd1}$ is:

$$O_{sd1} = \alpha L + \beta \Sigma c_t c_p* + \Sigma n c_p* \quad \text{Equation (6)}$$

where L is the product of the pilot spreading code $c_p$ and the complex conjugate of the pilot spreading code $c_p*$ summed over L chips.

The sum and dump 73 output $O_{sd1}$ is coupled to a low pass filter 75. The low pass filter 75 determines the mean value for each signal component. The mean value for pilot-traffic cross-correlation is zero and so is the mean value of the noise n. Therefore, after filtering 75, the second and third terms in Equation (6) become zero. The low pass filter 75 output $O_{lpf}$ over time is:

$$O_{lbf} = \alpha L. \quad \text{Equation (7)}$$

The low pass filter 75 output $O_{lpf}$ is coupled to a processing means 77 to derive the pilot code strength $\alpha$. The processing means 77 calculates $\alpha$ by dividing the low pass filter 79 output $O_{lpf}$ by L. Thus, the processing means 77 output $O_{pm}$ is:

$$O_{pm} = \alpha. \quad \text{Equation (8)}$$

The pilot spreading code $c_p*$ complex conjugate generator 69 is coupled to a complex conjugate processor 79 yielding the pilot spreading code $c_p$. The pilot spreading code $c_p$ is input to a second mixer 81 and mixed with the output of a traffic spreading code $C_t*$ complex conjugate generator 83. The resulting product from the second mixer 81 output is coupled to a second sum and dump processor 85. The output $O_{sd2}$ of the second sum and dump processor 85 is $\Gamma c_p c_t*$ and is combined with at a third mixer 87. The third mixer 87 output 89 is $\alpha \Gamma c_p c_t*$.

The received signal r is also despread by traffic despreader 91. The traffic despreader 91 despreads the received signal r by mixing the received signal r with the traffic code $c_t*$ complex conjugate generator 83 using a fourth mixer 93 yielding:

$$\Sigma rc_t^* = \alpha \Sigma c_p c_t^* + \beta \Sigma c_t c_t^* \Sigma nc_t^*. \quad \text{Equation (9)}$$

The traffic despreader 91 output 95 is coupled to a third sum and dump 97. The third sum and dump 97 output $O_{sd3}$ over time is:

$$O_{sd3} = \Sigma rc_t^* = \beta L + \alpha \Sigma c_p c_t^* + \Sigma nc_t^* \quad \text{Equation (10)}$$

where L is the product of the traffic spreading code $c_t$ and the complex conjugate of the traffic spreading code $c_t^*$ summed over L chips.

The third sum and dump 97 output $O_{sd3}$ is coupled to an adder 99 which subtracts the third mixer 87 output 89. The adder 99 output $O_{add}$ is:

$$O_{add} = \beta L + \alpha \Sigma c_p c_t^* + \Sigma nc_t^* - \alpha \Sigma c_p c_t^*. \quad \text{Equation (11)}$$

Thus, the pilot canceller 61 output $O_{add}$ is equal to the received signal r minus the pilot signal simplified below:

$$O_{add} = \beta L + \Sigma nc_t^*. \quad \text{Equation (12)}$$

The invention uses a similar approach to cancel unwanted traffic signal(s) from a desired traffic signal. While traffic signals are interference to other traffic signals just as the global pilot signal is, unwanted traffic signal cancellation differs from global pilot signal cancellation since a traffic signal is modulated by the data and is therefore dynamic in nature. A global pilot signal has a constant phase, whereas a traffic signal constantly changes phase due to data modulation.

The traffic signal canceller system 101 embodiment is shown in FIG. 5. As above, a received signal r is input 103 to the system:

$$r = \Psi d c_d + \beta c_t + n \quad \text{Equation (13)}$$

where the received signal r is a complex number and is comprised of the traffic code signal strength Θ multiplied with the traffic signal data d and the traffic code $c_d$ for the unwanted traffic signal to be canceled, summed with the desired traffic code strength β multiplied with the desired traffic code $c_t$, summed with noise n. The noise n includes all received noise and interference including all other traffic signals and the global pilot signal. To cancel the unwanted traffic signal(s) from the received signal r, the system 101 must derive the signal strength of the unwanted traffic code Θ to be subtracted and estimate the data d, where:

$$\Psi \neq d \neq \beta. \quad \text{Equation (14)}$$

When the received signal r is summed over time, Equation 13 can be expressed as:

$$\Sigma r = \Psi d \Sigma c_d + \beta \Sigma c_t + \Sigma n. \quad \text{Equation (15)}$$

Referring to FIG. 5, the received baseband signal r is input 103 into the desired traffic signal despreader 91 which despreads the desired traffic signal from the received signal r. Desired traffic signal mixer 93 mixes the received signal r with the complex conjugate $c_t^*$ of the desired traffic pn code used during spreading. The despread traffic signal is coupled to a sum and dump processor 97 and summed over time. The sum and dump 97 output $O_{sd3}$ is:

$$O_{sd3} = \Sigma rc_t^* = \beta L + \Psi d \Sigma c_d c_t^* + \Sigma nc_t^*. \quad \text{Equation (16)}$$

The traffic signal canceller system 101 shown in FIG. 5 includes n unwanted traffic signal cancellers 115₁–115ₙ. An exemplary embodiment includes 10 (where n=10) unwanted traffic signal cancellers 115₁–115₁₀.

Each unwanted traffic signal canceller 115₁–115ₙ comprises: an unwanted traffic signal despreader 139₁–139ₙ that includes a first mixer 117₁–117ₙ and an unwanted traffic signal code generator 119₁–119ₙ; second 133₁–133ₙ mixer, first 121₁–121ₙ and second 123₁–123ₙ sum and dump processors, a hard decision processor 125₁–125ₙ, a low pass filter 127₁–127ₙ, a processing means 129₁–129ₙ, third mixer 131₁–131ₙ, a conjugate processor 135₁–135ₙ, an adjustable amplifier 137₁–137ₙ, and a desired traffic signal code generator 83.

As above, the received signal r is input 103 into each unwanted traffic canceller 115₁–115ₙ. The unwanted traffic signal despreader 139₁–139ₙ is coupled to the input 103 where the received signal r is mixed 117₁14 117ₙ with the complex conjugate $c_{d1}^* - c_{dn}^*$ of the traffic pn sequence for each respective unwanted signal. The despread 139₁–139ₙ traffic signal is coupled to a first sum and dump processor 121₁–121ₙ where it is summed over time. The first sum and dump 121₁–121ₙ output $O_{sd1n}$ is:

$$O_{sd1n} = \Sigma rc_{dn}^* = \Psi dL + \beta \Sigma c_t c_{dn}^* + \Sigma nc_{dn}^*. \quad \text{Equation (17)}$$

where L is the product of the unwanted traffic signal spreading code $c_{dn}$ and $c_{dn}^*$ is the complex conjugate of the unwanted traffic signal spreading code.

The first sum and dump 121₁–121ₙ output $O_{sd1n}$ is coupled to the hard decision processor 125₁–125ₙ. The hard decision processor 125₁–125ₙ determines the phase shift Ø in the data due to modulation. The hard decision processor 125₁–125ₙ also determines the QPSK constellation position d that is closest to the despread symbol value.

Figure 6:
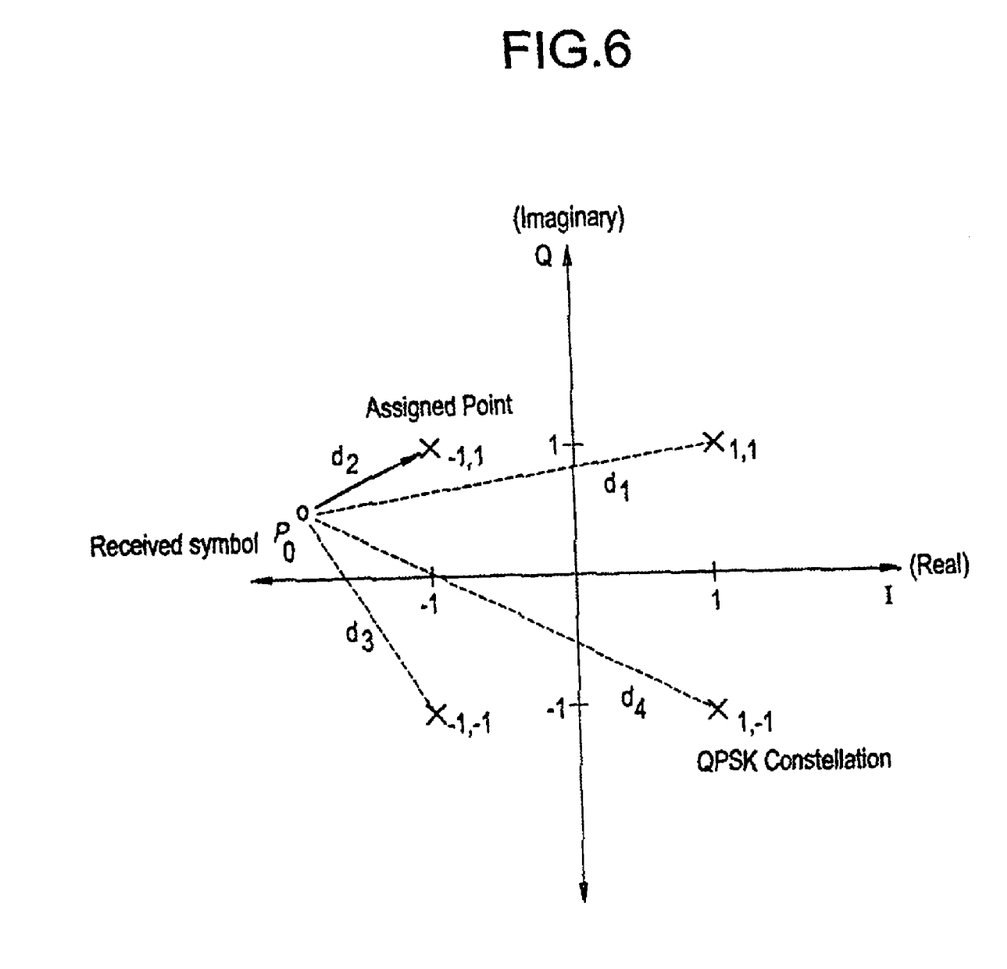
FIG. 6 is a diagram of a received symbol $p_o$ on the QPSK constellation showing a hard decision.

As shown in FIG. 6, the hard decision processor 125₁–125ₙ compares a received symbol $p_o$ of a signal to the four QPSK constellation points $x_{1,1}$, $x_{-1,1}$, $x_{-1,-1}$, $x_{1,-1}$. It is necessary to examine each received symbol $p_o$ due to corruption during transmission 47 by noise and distortion, whether multipath or radio frequency. The hard decision processor computes the four distances $d_1$, $d_2$, $d_3$, $d_4$ to each quadrant from the received symbol $p_o$ and chooses the shortest distance $d_2$ and assigns that symbol d location $x_{-1,1}$. The hard decision processor also derotates (rotates back) the original signal coordinate $p_o$ by a phase amount Ø that is equal to the phase corresponding to the selected symbol location $x_{-1,1}$. The original symbol coordinate $p_o$ is discarded.

The hard decision processor 125₁–125ₙ phase output Ø is coupled to a low pass filter 127₁–127ₙ. Over time, the low pass filter 127₁–127ₙ determines the mean value for each signal component. The mean value of the traffic-to-traffic cross-correlation and also the mean value of the noise n are zero. Therefore, the low pass filter 127₁–127ₙ output $O_{lpfn}$ over time is:

$$O_{lpfn} = \Psi L. \quad \text{Equation (18)}$$

The low pass filter 127₁–127ₙ output $O_{lpfn}$ is coupled to the processing means 129₁–129ₙ to derive the unwanted traffic signal code strength Θ. The processing means 129₁–129ₙ estimates Ø by dividing the filter 127₁–127ₙ output $O_{lpfn}$ by L.

The other hard decision processor 125₁–125ₙ output is data d. This is the data point d corresponding to the smallest of the distances $d_1$, $d_2$, $d_3$, or $d_4$ as shown in FIG. 6. Third mixer 131₁–131ₙ mixes the unwanted traffic signal strength Θ with each data value d.

The unwanted traffic signal spreading code complex conjugate generator $c_{d1}^* - c_{dn}^*$ is coupled to the complex conjugate processor $135_1$–$135_n$ yielding the unwanted traffic signal spreading code $c_{d1}$–$c_{dn}$ and is input to the second mixer $133_1$–$133_n$ and mixed with the output of desired traffic signal spreading code complex conjugate generator $c_t^*$. The product is coupled to the second sum and dump processor $123_1$–$123_n$. The second sum and dump processor $123_1$–$123_n$ output $O_{sd2n}$ is $\Gamma cd_n c_t^*$ and is coupled to variable amplifier $137_1$–$137_n$. Variable amplifier $137_1$–$137_n$ amplifies the second sum and dump processor $123_1$–$123_n$ output $O_{sd2n}$ in accordance with the third mixer $131_1$–$131_n$ output which is the determined gain.

The variable amplifier $137_1$–$137_n$ output $141_1$–$141_n$ is coupled to an adder 143 which subtracts the output from each variable amplifier $137_1$–$137_n$ from the output of the desired traffic signal despreader 115. The output O is:

$$O=\beta L+\Psi d\Sigma c_d c_t^*+\Sigma n c_t^*-\Psi d\Sigma c_d c_t^*. \quad \text{Equation (19)}$$

The adder 143 output O (also the unwanted traffic canceller system 101 output) is equal to the received signal r minus the unwanted traffic signals simplified below:

$$O=\beta L+\Sigma n c_t^* \quad \text{Equation (20)}$$

where the noise n varies depending on the amount of traffic signals subtracted from the received signal.

Another embodiment 145 canceling the global pilot signal and unwanted traffic signals is shown in FIG. 7. As previously discussed, the unwanted traffic cancellation system 101 includes the desired traffic signal despreader 91 and a plurality of unwanted traffic signal cancellers $115_1$–$115_n$. The traffic cancellation system is coupled in parallel with the pilot cancellation system 61 previously described, but without a desired traffic signal despreader. A common input 147 is coupled to both systems 101, 61 with a common adder 149 which is coupled to the outputs O, $O_{add}$ from both systems 101, 61. The pilot and unwanted traffic signals are subtracted from the desired traffic signal yielding an output 151 free of interference contributions by the pilot and plurality of transmitted traffic signals.

While specific embodiments of the present invention have been shown and described, many modifications and variations could be made by one skilled in the art without departing from the spirit and scope of the invention. The above description serves to illustrate and not limit the particular form in any way.

What is claimed is:

1. A mobile user receiver having a cancellation system for removing selected signals from a traffic signal prior to decoding, the mobile user receiver comprising:

a receiver having a system input for receiving communication signals from a transmitter over an air interface;

said system input supplied to a traffic signal cancellation system for canceling unwanted traffic signals, said traffic signal cancellation system having an output;

said system input also supplied to a pilot signal cancellation system for removing a global pilot signal, said pilot signal cancellation system having an output; and whereby said pilot signal cancellation system output is subtracted from said traffic signal cancellation system output to provide a cancellation system output free from unwanted traffic signals and the global pilot signal.

2. The mobile user receiver according to claim 1 wherein said traffic cancellation system includes a desired traffic signal despreader coupled to a sum and dump processor to produce an output and an unwanted traffic signal canceller, said unwanted traffic signal canceller comprising:

an unwanted traffic signal despreader having a signal input coupled to said system input, a summed output, an unwanted traffic signal code generator, and a first mixer for mixing an output of the generator with said system input to produce an unwanted traffic signal despreader summed output;

said unwanted traffic signal despreader summed output coupled to a hard decision processor having a phase output and a data output;

said hard decision processor phase output coupled to a low pass filter having an output;

said low pass filter output coupled to an input of a processor that filters the product of the unwanted traffic signal to a desired traffic signal cross-correlation outputting the unwanted traffic signal strength;

said processor output multiplied with said hard decision processor data output with a first multiplier having an output delivered to an adjustable amplifier;

said unwanted traffic signal code generator output coupled to an input of a complex conjugate processor having an output;

said complex conjugate processor output mixed with a complex conjugate of the desired traffic signal code by a second mixer having an output;

said second mixer output coupled to an input of a first sum and dump processor having an output;

said first sum and dump processor output coupled to an input of said amplifier, said amplifier having an adjustable gain controlled by said multiplier output; and said amplifier having an output coupled to an adder, said adder subtracting the output of each variable amplifier from said desired traffic signal despreader summed output to obtain said traffic signal cancellation system output.

3. The mobile user receiver according to claim 1 wherein said pilot signal cancellation system includes:

a global pilot despreader coupled to said system input and having a summed output;

a desired traffic signal and global pilot cross-correlation means having an output;

said global pilot despreader output coupled to a pilot signal strength determining means having an output;

said pilot signal strength determining means output multiplied with said cross-correlation means output; and said multiplied product is said pilot signal cancellation system output.

4. The mobile user receiver according to claim 3 wherein said cross-correlation means includes:

a global pilot spreading code complex conjugate code generator;

a desired traffic signal complex conjugate code generator;

a second mixer for cross-correlating said global pilot spreading code and said desired traffic signal complex conjugate code; and a second sum and dump processor for summing over time said cross-correlation product.

5. The mobile user receiver according to claim 4 wherein said pilot strength determining means further includes:

a low-pass filter having an output; and a processor coupled to said low-pass filter output, said processor deriving and outputting the global pilot signal strength.

6. A mobile user receiver having a global pilot signal cancellation system for removing a global pilot signal from a desired traffic signal prior to decoding, the mobile user receiver comprising:

a receiver having a system input for receiving communication signals from a transmitter and a system output;

said system input coupled to a global pilot despreader and a desired traffic signal despreader, each having a summed output;

a desired traffic signal and global pilot cross-correlation means;

said global pilot despreader output coupled to a pilot signal strength determining means having an output;

said pilot signal strength determining means output multiplied with said cross-correlation means output; and said multiplied product subtracted from said desired traffic signal despreader output, thereby outputting the desired traffic signal free from the global pilot signal.

7. The mobile user receiver according to claim 6 wherein said pilot signal strength determining means further includes:

a low-pass filter having an output; and a processor coupled to said low-pass filter output, said processor deriving and outputting the global pilot signal strength.

8. A mobile user receiver having a traffic signal cancellation system for removing at least one unwanted traffic signal prior to decoding, the mobile user receiver comprising:

a receiver having a system input for receiving communication signals from a transmitter and a system output;

said input coupled to a desired traffic signal despreader having a first summed output; and at least one unwanted traffic signal canceller, comprising:

an unwanted traffic signal despreader having an input coupled to said first summed output and a second summed output, an unwanted traffic signal code generator, and a first mixer for mixing an output of said generator with said system input to produce a unwanted traffic signal despreader summed output;

said unwanted traffic signal despreader summed output coupled to a hard decision processor having a phase output and a data output;

said hard decision processor phase output coupled to a low pass filter having an output;

said low pass filter output coupled to an input of a processor that filters the product of the unwanted traffic signal to desired traffic signal cross-correlation outputting the unwanted traffic signal strength;

said processor output multiplied with said hard decision processor data output with a multiplier having an output delivered to an adjustable amplifier;

said unwanted traffic signal code generator output coupled to an input of a complex conjugate processor having an output;

said complex conjugate processor output mixed with a complex conjugate of the desired traffic signal code by a second mixer having an output;

said second mixer output coupled to an input of a second sum and dump processor having an output;

said second sum and dump processor output coupled to an input of said amplifier, said amplifier having an adjustable gain controlled by said multiplier output; and said amplifier having an output coupled to an adder, said adder subtracting the output of each variable amplifier from said desired traffic signal despreader summed output to obtain said system output.

9. A method for removing selected signals from a traffic signal comprising the steps of:

providing a system input for receiving communication signals from a transmitter over an air interface;

inputting the system input to a traffic signal cancellation system having an output equal to a desired traffic signal minus unwanted traffic signals;

inputting the system input to a pilot signal cancellation system to remove a global pilot signal and providing an output equal to the desired traffic signal minus the global pilot signal; and subtracting the pilot signal cancellation system output from the traffic signal cancellation system output to provide a system output.

10. The method of claim 9 further comprising the steps of:

coupling a desired traffic signal despreader to a sum and dump processor to produce an output; and providing an unwanted traffic signal canceller having an unwanted traffic signal despreader and a summed output.

11. The method of claim 10 further comprising the steps of:

coupling a signal input of the unwanted traffic signal despreader to the system input;

providing the unwanted traffic signal despreader with an unwanted traffic signal code generator and a first mixer for mixing an output of the generator with the signal input to produce an unwanted traffic signal canceller output;

coupling a summed output of the unwanted traffic signal despreader to a hard decision processor having a phase output and a data output;

coupling the hard decision processor phase output to a low pass filter, the low pass filter having an output;

coupling the low pass filter output to an input of a processor that filters the product of the unwanted traffic signal to a desired traffic signal cross-correlation, and outputting the unwanted traffic signal strength;

multiplying the processor output with the hard decision processor data output and delivering the output to an adjustable amplifier;

coupling the unwanted traffic code generator output to an input of a complex conjugate processor having an output;

mixing the complex conjugate processor output with a complex conjugate of the desired traffic signal code using a second mixer having an output;

coupling the second mixer output to an input of a first sum and dump processor having an output;

coupling the first sum and dump processor output to an input of an amplifier having an adjustable gain controlled by said multiplier output; and coupling the amplifier output to an adder which subtracts the output of each variable amplifier from the desired traffic signal despreader output to obtain the traffic signal cancellation system output.

12. A method for removing the global pilot signal from a desired traffic signal, comprising the steps of:

providing an input for receiving communication signals from a transmitter over an air interface;

inputting the input to a global pilot signal cancellation system having a system output;

coupling the input to a global pilot despreader and a desired traffic signal despreader, each having a summed output;

identifying a desired traffic signal and providing a global pilot cross-correlation means;

coupling the global pilot despreader summed output to a pilot strength determining means having an output;

multiplying the pilot strength determining means output with the cross-correlation means output;

subtracting the multiplied product from the desired traffic signal despreader summed output; and outputting the desired traffic signal free from the global pilot signal.

* * * * *

UNITED STATES PATENT AND TRADEMARK OFFICE
CERTIFICATE OF CORRECTION

PATENT NO. : 6,950,411 B2 Page 1 of 1
APPLICATION NO. : 10/462489
DATED : September 27, 2005
INVENTOR(S) : Ozluturk et al.

It is certified that error appears in the above-identified patent and that said Letters Patent is hereby corrected as shown below:

IN THE SPECIFICATION

At column 4, line 46, delete "$O_{lbf} = \propto L.$" and insert therefor --$O_{lpf} = \propto L.$--.

At column 4, line 59, after the word "code", delete "$C_t*$" and insert therefor --$c_t*$--.

At column 5, line 4, delete "$\sum rc_t* = \propto \sum c_p c_t* + \beta \sum c_t c_t* \sum nc_t*.$" and insert therefor --"$\sum rc_t* = \propto \sum c_p c_t* + \beta \sum c_t c_t* + \sum nc_t*$--.

At column 6, line 6, after the word "second", delete "$133_{1-133n}$" and insert therefor --$133_1 - 133_n$--.

At column 6, line 16, after the word "mixed", delete "$117_1 14\ 117_n$" and insert therefor --$117_1 - 117_n$--.

IN THE CLAIMS

In claim 8, at column 9, line 40, after the word "produce", delete "a" and insert therefor --an--.

Signed and Sealed this

Eighteenth Day of March, 2008

JON W. DUDAS
*Director of the United States Patent and Trademark Office*